Feb. 8, 1938.  D. F. NEWMAN  2,107,708
SCREEN STRUCTURE
Filed April 17, 1936
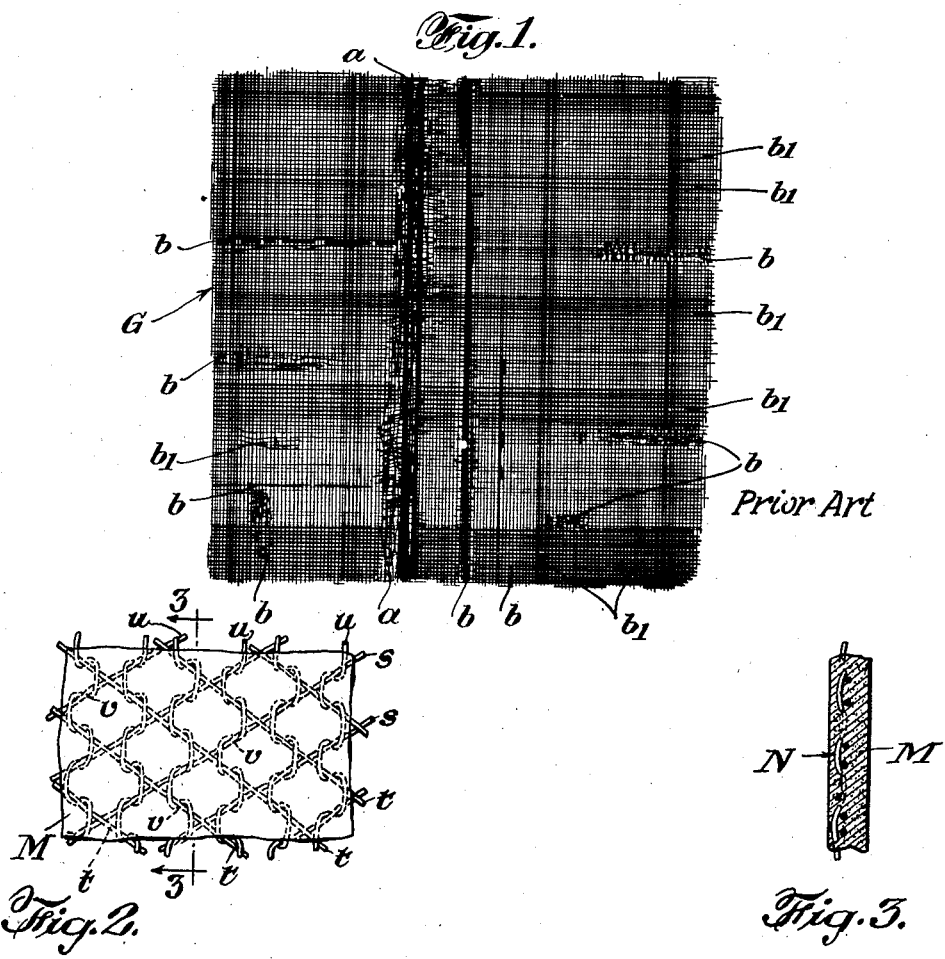
INVENTOR
David F. Newman
BY
ATTORNEYS Patented Feb. 8, 1938

2,107,708

UNITED STATES PATENT OFFICE 2,107,708

SCREEN STRUCTURE

David F. Newman, Rockville Centre, N. Y., assignor to Trans-Lux Corporation, a corporation of Delaware Application April 17, 1936, Serial No. 74,914

2 Claims. (Cl. 88—24)

My invention relates to a composite structure utilizable, if desired, solely as a screen for rear projection purposes. My invention also has reference to a composite structure serving, if desired, in a dual manner, i. e., as a rear projection screen and in connection with or as a part of a sound reproducing system. It shall be understood that references in this specification and in the appended claims to a "screen" or "projection screen" shall be understood as generically comprehending a screen utilizable solely for projection purposes or in connection with a sound reproducing system as stated.

In accordance with my invention, a screen or composite structure of the character stated comprises screen-forming material having associated, incorporated, or combined therewith fabric of a character not heretofore used in the screen art and possessing advantages over those fabrics which have been used in association with screen-forming material.

Further objects, advantages and characteristics of my invention will become apparent from the following description.

My invention resides in the screen, composite structure, features and arrangements of the character hereinafter described and claimed.

This application is a continuation in part of my prior application Serial No. 512,533, filed January 31, 1931, renewed September 1, 1933.

On the accompanying drawing:

Figure 1 is a view illustrating fabric of a character heretofore used in association with screen-forming material;

Fig. 2 is an enlarged plan view illustrating a section of a screen as constructed in accordance with my invention; and Fig. 3 is a vertical sectional view taken substantially on the line 3—3 of Fig. 2 looking in the direction of the arrows.

My invention relates particularly although not necessarily to screens or composite structures of the character stated which comprise translucent screen-forming or body material formed from gelatine and glycerine or other material as may be desirable and with which there is associated or incorporated a sheet of fabric of a type not heretofore used in the screen art, such screens being adapted particularly for rear projection.

More particularly, the aforesaid body material may be of a character known to those skilled in the art. For example, such body material may correspond more or less with that disclosed in U. S. Letters Patent No. 1,151,502, No. 1,231,727, or No. 1,980,285, it being understood, however, that the use of some of the agents mentioned in said Letters Patent is optional depending upon the use for which the projection screen is intended. As understood in the art, the aforesaid body material may be so produced that it exists as a mass of viscous material.

From the viscous material thus obtained, a sheet-like screen or screen structure of suitable thickness may be produced in any suitable manner. Preferably, this is accomplished by a molding operation, a suitable matrix table embodying a plane surface of suitable material and extent or area being utilized for the reception of the mixture. The surface of the table should be bordered by a retaining wall of a height substantially equal to the thickness of the screen or composite structure to be produced and said table should be heated to suitable extent, preferably within a range somewhat below the temperature of the aforesaid mixture.

After the matrix table has been brought to such suitable temperature conditions as stated and with the aforesaid mixture in proper condition, the latter should be poured on or applied to the table, preferably until it slightly overflows the bordering wall thereof. The excess material should now be removed, as by application of a straight edge to the aforesaid retaining wall.

It has been proposed, in accordance with the disclosure of Troeger U. S. Letters Patent No. 1,216,380, to strengthen a screen with strands and, more particularly, these strands may be of silken thread. Further and in accordance with the disclosure of U. S. Letters Patent No. 1,672,656 to Arthur C. Payne, it is known that there may be associated with screen-forming material a crinkly fabric and, more particularly, one of irregular weave, as georgette crepe, such as is shown at G on Fig. 1 of the drawing.

Primarily, fabrics, as aforesaid, are utilized so as to prevent or impede sag of the screen when it is subjected to high and/or humid temperature conditions. A fabric such as georgette crepe is reasonably satisfactory for the intended purpose but this does not hold true under all conditions and circumstances. Such a fabric is of the interlaced strand type and, if the width thereof exceeds 76 inches ordinarily or 92 inches as the usual highest limit, a sort of selvage as at $a$, Fig. 1, is formed by the weaving machinery when the width attains the value stated above, this selvage extending longitudinally of the fabric whereby the latter in a lengthwise zone is non-uniform as compared with the more uniform material at opposite sides of said zone. This selvage is not a true one inasmuch as it consists merely of an accumulation or closer grouping of the lengthwise strands in the aforesaid lengthwise zone, it having proven impractical to overcome this condition due to mechanical limitations of commercial weaving machinery if the fabric widths exceed those stated above.

Aside from the primary defect noted above, interlaced strand fabric such as georgette crepe is objectionable in a number of more or less secondary respects.

Thus, as indicated at b, Fig. 1, the fabric G may be more or less irregular both longitudinally and transversely, such defects arising for a variety of reasons such, for example, as the improper handling or placement of the delicate strands, the fact that such strands are apt to vary in diameter in different lengthwise zones, etc.

Further, as indicated at b1, Fig. 1, commercially woven silk fabric is characterized by non-uniformity. More particularly, this non-uniform condition is present both lengthwise and crosswise of the fabric and appears as a series of alternating light and dark bands of varying widths.

For ordinary non-screen uses, artificial fillers may be so associated with the fabric as to cause it to be of substantially uniform appearance, such artificial fillers rendering minor selvages and other non-uniform conditions practically unnoticeable. However, as known to the art and partly as hereinafter stated, fabrics to be used in the production of projection screens of the character herein described should be free from such artificial fillers and should also be as free as possible of inherent foreign matter such as gums, resins, etc. Under such conditions, the association with screen-forming material, as described above, of an irregular or non-uniform fabric such, for example, as of the general character shown in Fig. 1 causes the screen, during projection, to be of non-uniform appearance since the selvaged and other irregular or non-uniform areas are dark and there is a marked contrast between them and adjacent more truly uniform areas. This contrasting appearance between adjacent screen areas, of course, is objectionable.

I have determined that, as a substitute for fabric of the type described above, i. e., fabric of the interlaced strand type wherein the warp and filling threads are disposed at right angles and are not twisted around each other, there may advantageously be utilized net fabric preferably formed from silk strands as fabricated, for example, on a rolling locker plain net machine. Net fabric as produced by such machines may have a width, for example, of twenty-four feet and such fabric may be much longer than this, if desired, said fabric being of generally uniform character throughout the area thereof in the sense that the strand arrangement appears regular and uniform, there being little or no selvage or other non-uniformity such as indicated at a, b and b1 of the fabric G of Fig. 1. Accordingly, when the dimensions of a desired screen are large, as of the order of thirteen by eighteen feet, more or less, a section of the above described net fabric may be associated with the body material to thereby produce a screen which, during the projection operation, does not exhibit non-uniformities such as exist in the fabric G.

Accordingly, to construct the screen of my invention, a suitable sheet of net fabric, such as indicated at N, Fig. 2, from which foreign matter such as gums, resins, etc., has been suitably removed should be stretched on a frame having an opening of such extent that it fits snugly around the aforesaid retaining wall of the matrix table. As shown, any given section of this net fabric N is formed from spaced parallel strands s, s, etc. disposed in angular relation with respect to the spaced parallel strands t, t, etc., these strands crossing each other in non-twisted relation and being herein designated as the filler strands. The longitudinal strands u are associated with the aforesaid sets of angularly related filler strands, these longitudinal strands u being disposed in generally parallel relation with respect to each other, each strand u being twisted around or intertwisted with each of the strands s and t as indicated at v.

After the excess screen-forming material has been removed from the matrix table as stated above, the sheet of net fabric N is suitably lowered toward and into engagement with the upper surface of the material on the matrix table, care being taken to avoid entrapment of air between the net fabric sheet and the viscous material. In so doing, the frame holding said net fabric sheet comes into position around the aforesaid retaining wall of the matrix table, and thereupon the net fabric sheet sinks into or becomes associated with the viscous material. At this time, application of heat to the matrix table should be discontinued and, after a suitable cooling period, as two or three hours, has elapsed, a knife should be passed between the frame holding the net fabric sheet and the retaining wall of the matrix table to sever said sheet from its frame. Thereupon, the molded screen, now translucent to a desired degree, may be removed from the matrix table in any suitable manner. As indicated in Figs. 2 and 3, the operation thus described yields a screen which comprises a sheet of translucent material M with which is combined the aforesaid sheet of net fabric N.

Thereafter, the edges of the screen should be suitably bound, as by canvas strips or the like adhesively or otherwise suitably secured thereto, the strips preferably being provided with eyelets. When the screen is installed for use, a suitable frame should be provided and the screen positioned therein under a suitable degree of tension, as by rope passing through the eyelets and engaging the frame.

A screen constructed in accordance with my invention is durable and functions in an entirely satisfactory way for the display of representations to an audience. The net fabric sheet N functions in a desirable manner to reinforce the screen and to thereby prevent or impede the aforesaid screen sag. In this connection, it seems that net fabric, probably due to the different mesh characteristics, (the mesh preferably being relatively much larger with net fabric than with the prior interlaced strand fabric) is more readily or better associatable with the viscous screen-forming material than are the interlaced strand fabrics heretofore used in this connection. At the same time, the net fabric is highly satisfactory from the projection viewpoint. This follows because net fabric of the type described is of uniform character throughout and, as a result, the screen, during projection, is not streaked or other irregular appearance. In addition, it has been determined in practice that, in an unpredictable manner and for an unknown reason, sections of a sheet of interlaced strand fabric G do not always amalgamate or sink into the translucent body material when said fabric sheet is lowered into engagement therewith. This defect, when it occurs, is noticeable to a marked extent during the projection operation and renders the screen unsatisfactory for use. Experience has demonstrated that the use of net fabric N overcomes the difficulty last noted. That is, such net fabric N, throughout the entire area thereof, amalgamates or sinks into the viscous body material to thereby produce a screen of highly desirable character from the projection viewpoint.

As hereinbefore stated, my invention has reference to a rear projection screen which, as well understood in the art, is disposed between the projector and those viewing the images on said screen. With a rear projection screen, the light passes through the screen during the projection operation and, therefore, any imperfections such as those existing in the sheet of interlaced strand fabric G are in the visible field and hence objectionable. However, when the screen comprises a sheet of net fabric N, in lieu of the interlaced strand fabric G, the screen throughout the entire area thereof is of regular, uniform appearance, this, of course, being highly desirable.

It is well known in the art that interlaced strand fabric of the character shown in Fig. 1 is one in which the warp and filling threads are disposed at right angles to each other, the filling threads crossing the warp threads in non-twisted relation such, for example, as illustrated in the aforesaid Letters Patent No. 1,231,727. With a section of net fabric as herein described, the filler strands are disposed in crosswise relation with respect to each other and with respect to the longitudinal strands, said filler strands being intertwisted with or twisted around the longitudinal strands. It shall be understood that my invention as defined in the appended claims is limited to a translucent screen which is properly light diffusive, as determined by the light-diffusive agent and the fabric sheet, for rear projection practice and which comprises a sheet of net fabric of the character just described.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In a projection screen, a sheet-like body of translucent material, and a sheet of net fabric combined with said body of translucent material, the filler strands of the sheet of net fabric being disposed in crosswise relation with respect to each other and with respect to the longitudinal strands of said sheet of net fabric, said filler strands being intertwisted with or twisted around the longitudinal strands, said translucent material and said sheet of net fabric cooperating to form a screen properly light-diffusive for rear projection practice, a substantial amount of light passing through said net fabric and the translucent material when the screen is included in a rear projection system.

2. In a projection screen, a sheet-like body of translucent material formed principally from gelatine and glycerine, and a sheet of net fabric incorporated in said translucent material on one surface thereof, the filler strands of the sheet of net fabric being disposed in crosswise relation with respect to each other and with respect to the longitudinal strands of said sheet of net fabric, said filler strands being intertwisted with or twisted around the longitudinal strands, said translucent material and said sheet of net fabric cooperating to form a screen properly light-diffusive for rear projection practice, a substantial amount of light passing through said net fabric and the translucent material when the screen is included in a rear projection system.

DAVID F. NEWMAN.